United States Patent Office 2,872,355
Patented Feb. 3, 1959

2,872,355
PROCESS FOR IMPARTING FLAME RESISTANCE TO SOLID INFLAMMABLE MATERIAL

Karl W. Müller, Leverkusen, and Detlef Delfs, Opladen, Germany, assignors to Farbenfabriken Bayer Aktiengesellschaft, Leverkusen, Germany, a corporation of Germany No Drawing. Application February 24, 1954
Serial No. 412,396

Claims priority, application Germany February 26, 1953

1 Claim. (Cl. 117—136)

The present invention relates to salts of organic phosphorus compounds; more particularly it concerns salts of phosphoric acids, which have a smaller content of water than ortho-phosphoric acid, and basic condensation products formed by contacting aldehydes and nitrogen compounds having at least once the grouping

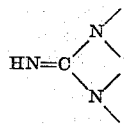

in an acyclic configuration.

The salts of the present invention can be obtained by any suitable methods, for instance by reacting the acids and the aforedefined condensation products or their water soluble salts in aqueous medium and recovering the precipitated reaction products.

As phosphoric acids containing a smaller amount of water than ortho-phosphoric acid there may be mentioned pyrophosphoric acid, metaphosphoric acid and other polyphosphoric acids. Suitable basic condensation products according to the invention are those prepared from preferably low molecular aliphatic aldehydes, especially formaldehyde or substances yielding formaldehyde, and nitrogen compounds, having at least once the grouping

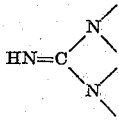

such as guanidine, dicyandiamide or dicyandiamidine. They are obtained, for instance, by contacting aqueous solutions of formaldehyde with the nitrogen compounds, preferably in an acid medium; also cyanamide may be used in this reaction since it yields nitrogen compounds of the above configuration under the reaction conditions. Besides, the basic nitrogen compounds may contain urea or thiourea.

The salts of the present invention are useful products for imparting flame-resistance to materials of all kinds, for instance fibre base material such as wood, fiber boards, paper and textiles. In the flameproofing treatment the salts may be applied in various manners, for instance in the form of a dispersion in water or organic liquids as well as in the form of a fine powder. It is also possible to produce the salts in situ, that means in the material to be rendered flameproof. In this case the materials are impregnated successively, in either order, with a solution containing the acid component and with a solution containing the basic component.

In many cases, the application of basic condensation products containing alkylol groups gives especially good results. By heating materials impregnated with the phosphorus salts of these condensation products a further condensation takes place which leads to improvements of the mechanical and water-resistant properties of the materials.

By reacting for instance wood pulp, as used in the manufacture of fiber boards, in the beater with pyro- or metaphosphates of the aforesaid basic condensation products, which contain free alkylol groups such as methylol groups, an addition of the customary sizing agents may be dispensed with to a more or less degree as the plates obtained by the usual method after pressing at elevated temperature are not only flame-resistant but also excellently stable against mechanical influences.

The compounds of the present invention are distinguished from the known flameproofing agents produced e. g. from ortho-phosphoric acid, dicyandiamide and formaldehyde in that they lead to impregnations of essentially better water repellency. As compared with the pyrophosphates of melamine-formaldehyde-condensation products, which have been proposed as flame-proofing agents, the products of the present invention are distinguished by the following properties: they have a lower melting point and therefore are absorbed by the material to be treated more easily and to a larger proportion so that, at the same time, the stability of the impregnated material is improved; furthermore, they have a lower decomposition point, thus ensuring a flame-resistance at lower temperatures; finally, they give rise to foam formation under the action of fire, which foam diminishes the heat conductivity substantially and renders the admission of air difficult.

Suitable quantitative proportions of the starting materials are indicated in the following examples, others can easily be found out by preliminary tests; the parts given in the examples are parts by weight.

Example 1

84 parts of dicyandiamide are suspended with stirring in 160 parts of formaldehyde (30%), the suspension is transformed to a clear solution by heating to 90° C. and 47 parts of concentrated hydrochloric acid are dropped into the solution within 30 minutes. The temperature, which rises quickly, is prevented from exceeding 100° C. by cooling the reaction mixture. After the reaction is complete, the mixture is kept at 100° C. for a further 10 minutes and then cooled to room temperature. A clear viscous solution is obtained which, if desired, can be diluted with water with the addition of some hydrochloric acid.

A solution of 58 parts of metaphosphoric acid in 200 parts of water is added to the aqueous solution of the dicyandiamide - formaldehyde - condensation product. The precipitating metaphosphate of the condensation product is filtered off and dried. The yield amounts to 150 parts. By carefully adjusting the pH of the solution to 2.5 with ammonia the yield is increased to 170 parts.

Example 2

The viscous solution of the dicyandiamide-formaldehyde-condensation product of Example 1 is mixed with 89 parts of pyrophosphoric acid in 200 parts of methanol; 185 parts of the pyrophosphate of the dicyandiamide-formaldehyde - condensation product, which contains 12.1% of phosphorus, are then obtained.

Example 3

84 parts of dicyandiamide are dissolved in 120 parts of hot formaldehyde (30%) and mixed with 88 parts of concentrated hydrochloric acid within 30 minutes, the temperature being kept at 100° C. After the reaction is complete, the mixture is kept at 100° C. for a further 10 minutes whereupon it is cooled to room temperature and stirred into a solution of 82 parts of sodium metaphosphate in 1500 parts of water. The precipitated metaphosphate of the dicyandiamide-formaldehyde-condensation product is filtered off and dried. 180 parts of the product, which contains 11.75% phosphorus, are obtained.

Example 4

84 parts of dicyandiamide are suspended in 120 parts of formaldehyde (30%) and dissolved by heating to 95° C.; 94 parts of concentrated hydrochloric acid are dropped into the solution within an hour, the temperature being prevented from exceeding 100° C. by cooling. The reaction mixture is heated to 100° C. for a further 15 minutes and allowed to cool. The viscous solution obtained is mixed with a solution of 125 parts of trisodium tripolyphosphate ($Na_3P_3O_{10}$) in 2000 parts of water containing 65 parts of concentrated hydrochloric acid. The precipitate formed—the polyphosphate of the dicyandiamide-formaldehyde-condensation product — is filtered off and dried in the air. 145 parts of the products, which contains 10.7% of phosphorus, are obtained.

Example 5

A pulp as it is used in the production of fiber boards, which consists of 20 parts of fibrous material in 800 parts of water, is mixed in a beater with 1 part of the finely powdered metaphosphate of the dicyandiamide-formaldehyde-condensation product prepared as described in Example 1. The pulp is then worked up to fiber boards in the usual process during which the material is heated to a temperature of 150° C. for some time and pressed at this temperature. The difficultly soluble metaphosphate taken up by the fibrous material melts at this temperature, is absorbed by the fibers and condensed completely. The fiber plates obtained are highly resistant to flames and possess excellent mechanical properties. If two or three times the amount of the metaphosphate is added to the pulp, the fiber plates obtained therefrom are completely resistant to flames.

Example 6

A pulp of 10 parts of wood or cellulose pulp in 500 parts of water is mixed with 1 part of the metaphosphate of the dicyandiamide-formaldehyde-condensation product described in Example 3 and worked up in the usual manner. The paper boards and paper produced from this material are flame-resistant and possess a high stability to mechanical stresses.

The same result is obtained if 1 part of the polyphosphate of Example 4 is applied instead of the metaphosphate of Example 3.

Example 7

Cotton skeins or filter paper are impregnated with the viscous solution of the dicyandiamide-formaldehyde-condensation product described in Example 1 and the material is passed through a 10% aqueous solution of metaphosphoric acid. After squeezing the material is dried at 110° C. for half an hour. The material thus treated is non-inflammable and does not glow under the action of fire; the impregnation is fast to water.

Example 8

A wood pulp containing 750 parts of wood fibers (dry) is mixed in a beater with 380 parts of the condensation product obtained from 840 parts of dicyandiamide, 900 parts of formaldehyde (90%) and 944 parts of concentrated hydrochloric acid in a manner as described in Example 4. The pulp is well stirred for 10 minutes and a solution of 120 parts of sodium metaphosphate in 1000 parts of water is added thereto. The fibrous plates produced from the pulp in the usual manner are flameproof and do not glow under the action of fire.

Example 9

Textile materials made from cotton are impregnated with a solution produced as follows:

168 g. of dicyandiamide are added in portions to a solution of 190 g. of concentrated hydrochloric acid in 200 cc. of water at 70° C. with vigorous stirring, care being taken that the temperature does not exceed 70° C. After the addition of the dicyandiamide stirring is continued at 70° C. for a further 30 minutes to complete the reaction. Into the clear hydrochloric acid solution of dicyandiamidine obtained, which contains a little guanidine, 160 g. of formaldehyde (30%) are dropped in the course of two hours at 70° C.; the condensation is completed by stirring the reaction mixture for a further 30 minutes at 70° C.; finally, the solution is diluted with water in the ratio 1:1.

The textile materials are then treated with a 10% aqueous solution of sodium metaphosphate or ammonium metaphosphate; thereafter they are rinsed with water and dried at 100° C. The materials are no longer inflammable.

Example 10

A mixture of 151 g. of dicyandiamide and 17 g. of guanidine carbonate is dissolved in 200 g. of formaldehyde (30%) with stirring and heating. At 90° C. 190 g. of concentrated hydrochloric acid are added within 1 hour whereafter the reaction mixture is heated to 90° C. for a further 30 minutes. On cooling the reaction mixture to room temperature a clear solution of the condensation product is obtained.

2.2 kg. of wood fibers (dry) in 100 liters of water are impregnated with this solution. Thereafter a solution of 162 g. of sodium metaphosphate in 1 liter of water is added with vigorous stirring. The fiber plates produced from the pulp are flameproof and do not glow when exposed to flames.

We claim:

A process for imparting flame-resistance to a solid inflammable material which comprises treating the material in either order with a member selected from the group consisting of phosphoric acids having a smaller content of water than orthophosphoric acid and their water soluble salts and with a basic condensation product formed by contacting, in the presence of hydrochloric acid, a lower aliphatic aldehyde and a nitrogen containing compound selected from the group consisting of guanidine, dicyandiamide and dicyandiamidine.

References Cited in the file of this patent

UNITED STATES PATENTS

| | | |
|---|---|---|
| 2,305,035 | Rosser | Dec. 15, 1942 |
| 2,464,342 | Pollak | Mar. 15, 1949 |
| 2,482,755 | Ford et al. | Sept. 27, 1949 |
| 2,488,034 | Pingree et al. | Nov. 15, 1949 |
| 2,530,261 | Morton | Nov. 14, 1950 |
| 2,549,059 | Creely | Apr. 17, 1951 |
| 2,582,961 | Burnell et al. | Jan. 22, 1952 |
| 2,628,946 | Juda et al. | Feb. 17, 1953 |

FOREIGN PATENTS

| | | |
|---|---|---|
| 476,043 | Great Britain | Nov. 29, 1937 |